United States Patent
Florit et al.

(10) Patent No.: US 8,111,634 B2
(45) Date of Patent: Feb. 7, 2012

(54) SYSTEM AND METHOD FOR INTEGRATING RING-PROTOCOL-COMPATIBLE DEVICES INTO NETWORK CONFIGURATIONS THAT ALSO INCLUDE NON-RING-PROTOCOL COMPATIBLE DEVICES

(75) Inventors: Lionel Florit, Greenbrae, CA (US); Robert W. Klessig, Los Altos Hills, CA (US); Francois E. Tallet, Santa Clara, CA (US); Pauline Shuen, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 499 days.

(21) Appl. No.: 11/504,941

(22) Filed: Aug. 15, 2006

(65) Prior Publication Data

US 2008/0123562 A1    May 29, 2008

(51) Int. Cl.
    *H04L 12/28* (2006.01)
(52) U.S. Cl. .................. 370/258; 370/403
(58) Field of Classification Search .......... None
    See application file for complete search history.

(56) References Cited

U.S. PATENT DOCUMENTS

| | | | | |
|---|---|---|---|---|
| 6,304,575 | B1 * | 10/2001 | Carroll et al. | 370/408 |
| 6,717,922 | B2 | 4/2004 | Hsu et al. | 370/258 |
| 7,860,119 | B1 * | 12/2010 | Enciso et al. | 370/403 |
| 2003/0162541 | A1 * | 8/2003 | Schwarzbauer et al. | 455/432 |
| 2003/0196081 | A1 * | 10/2003 | Savarda et al. | 713/153 |
| 2005/0008013 | A1 * | 1/2005 | Jamieson et al. | 370/389 |
| 2005/0243823 | A1 * | 11/2005 | Griswold et al. | 370/389 |
| 2006/0250969 | A1 * | 11/2006 | Florit et al. | 370/241 |
| 2007/0211701 | A1 * | 9/2007 | Smith et al. | 370/356 |
| 2008/0259786 | A1 * | 10/2008 | Gonda | 370/218 |
| 2008/0279203 | A1 * | 11/2008 | Ramalho Ribeiro dos Santos et al. | 370/406 |

OTHER PUBLICATIONS

S. Shah and M. Yip, Network Working Group—RCF 3619, "Extreme Networks' Eithernet Automatic Protection Switching (EAPS) Version 1," Oct. 2003, pp. 1-7.

Cisco Systems, White Paper, "Strategic Directions Moving the Decimal Point: An Introduction to 10 Gigabit Ethernet," © 1992-2002 Cisco Systems, Inc., pp. 1-18, posted Jan. 2006.

Foundry Networks, White Paper, "Metro Ring Protocol (MRP)," © 2002 Foundry Networks, Inc., Apr. 2002, pp. 1-6.

* cited by examiner

*Primary Examiner* — Nittaya Juntima
*Assistant Examiner* — Tito Pham
(74) *Attorney, Agent, or Firm* — Campbell Stephenson LLP

(57) ABSTRACT

Various systems and methods for integrating ring-protocol-compatible devices into network configurations that also include non-ring-protocol-compatible devices are disclosed. One such method, which can be performed by a network node that supports a ring protocol, involves generating a ring protocol packet and sending that ring protocol packet to a neighboring node. The ring protocol packet includes information, and the presence of this information within the packet causes a network device that receives the ring protocol packet to drop the ring protocol packet unless the network device supports a ring protocol. The information can include a reserved address (e.g., in the destination address field of the packet) as well as a ring protocol identifier.

11 Claims, 6 Drawing Sheets

SYSTEM AND METHOD FOR INTEGRATING RING-PROTOCOL-COMPATIBLE DEVICES INTO NETWORK CONFIGURATIONS THAT ALSO INCLUDE NON-RING-PROTOCOL COMPATIBLE DEVICES

FIELD OF THE INVENTION

This invention relates to networking and, more particularly, to protocols for operating a ring network.

DESCRIPTION OF THE RELATED ART

There are several situations involving network topologies, such as ring networks, in which packet forwarding loops can arise. First of all, the ring itself forms a loop. Additional loops may arise when several rings are connected, or when additional networks are connected to a ring.

In order to prevent forwarding loops, a ring network implements a ring protocol that is configured to detect whether the loop is complete and, if so, to block traffic at one point in the loop. Under normal operating circumstances, this configuration allows packets to be forwarded normally and avoids the undesirable behavior that might arise if a forwarding loop was present within the ring network. If a break occurs within the ring, the ring protocol detects the break and, in response, ceases blocking traffic. This allows packets to continue to be forwarded around the ring, despite the break. The break itself acts to prevent forwarding loops in this scenario.

In conventional ring networks, the ring network can only include devices that implement the ring protocol. If any devices that do not implement the ring protocol are included within the ring network, the ring network is not guaranteed to operate properly, or even to operate at all. As a result, a customer who is considering upgrading to a new type of ring network is forced to either purchase all new components at the same time or to delay upgrading altogether. Accordingly, it is desirable to be able provide techniques that allow a ring network to include some devices that support a particular ring protocol and some devices that do not.

BRIEF DESCRIPTION OF THE DRAWINGS

A more complete understanding of the present invention may be acquired by referring to the following description and the accompanying drawings, in which like reference numbers indicate like features.

Figure 1:
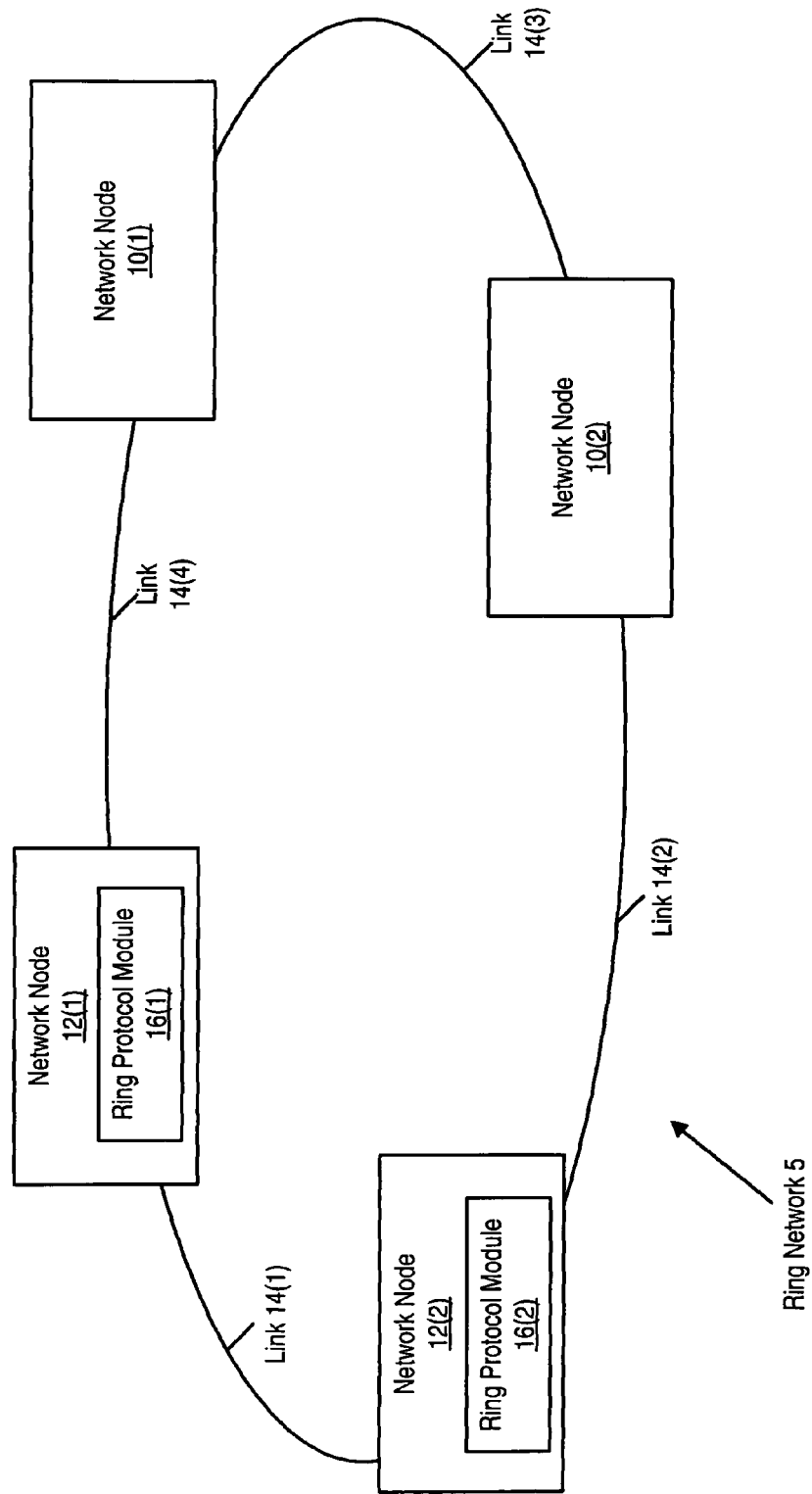
FIG. 1 shows an example of a ring network in which some, but not all, network nodes support a ring protocol, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 shows an example of a ring network 5 that includes four network nodes. Network nodes 10(1) and 10(2) do not support a particular ring protocol, while network nodes 12(1) and 12(2) do support the particular ring protocol.

Each link 14(1)-14(4) within ring network 5 can provide bidirectional communication between a pair of network nodes. Link 14(1) couples network nodes 12(1) and 12(2). Link 14(2) couples network nodes 10(2) and 12(2). Link 14(3) couples network nodes 10(1) and 10(2). Link 14(4) couples network nodes 10(1) and 12(1).

Network nodes 10(1)-10(2) and 12(1)-12(2) are network devices such as switches, routers, bridges, and the like that perform operations such as packet switching, routing, and/or bridging of messages. Network nodes 10(1)-10(2) and 12(1)-12(2) can act as part of an access network that provides customers and/or end-users with access to a larger network (e.g., an Open Standards Interconnection (OSI) layer 2 or layer 3 network). In such a situation, one or more of network nodes 10(1)-10(2) and 12(1)-12(2) can be coupled to customer devices (e.g., routers and/or switches) and/or end-user devices such as hosts. Additionally, network nodes 10(1)-10(2) and 12(1)-12(2) can be coupled to network equipment that interconnects one or more access networks with a larger network.

Within each of network nodes 12(1) and 12(2), the two ports that are coupled to ring network 5 are configured as ring ports. For example, the ports within network node 12(1) that are coupled to links 14(1) and 14(4) are configured as paired ring ports. Similarly, the ports within network node 12(2) that are coupled to links 14(1) and 14(2) are configured as paired ring ports. During normal operation (e.g., when none of the ring ports are blocked or configured as reflector ports, as described in more detail below), a unicast data packet that is received on one ring port and that is destined for a device reachable via the other ring port is sent via the other ring port in the pair. Thus, if network node 12(1) receives a unicast data packet, which is not destined for any of the non-ring ports (not shown) within network node 12(1), via a ring port via link 14(4), network node 12(1) will forward the data packet via the paired ring port coupled to link 14(1) (if the destination address is unknown, network node 12(1) can also "flood" the data packet by sending a copy of the data packet from each non-ring port in the same virtual local area network (VLAN) as the ring port that received the data packet).

A ring protocol packet sent to one of network nodes 12(1) and 12(2) is detected by the receiving ring port and processed by the network node. For example, in response to receiving a ring protocol packet, the receiving ring port can generate an interrupt that causes a ring protocol module within the network node to handle the ring protocol packet. In response to processing a ring protocol packet, the ring protocol module can generate a ring protocol packet, which may simply be a copy of the received ring protocol packet, to send from either the receiving ring port (e.g., if the generated ring protocol packet contains a response to the received ring protocol packet) or from the paired ring port (e.g., if the ring protocol packet is being sent around the ring).

Network nodes 12(1) and 12(2) implement a ring protocol that is not supported by network nodes 10(1) and 10(2). When implemented within a ring network, like the one shown in FIG. 1, that includes some nodes that do not support the ring protocol, the ring protocol will detect that not all of the nodes within the ring network support the ring protocol. In response, the ring protocol will alter its normal behavior, as described in more detail below. In brief, in response to detecting that fewer than all of the nodes within the ring network support the ring protocol, the ring protocol will behave in such a way that the sections of the ring network that support the ring protocol are completely transparent to the sections of the ring network that do not support the ring protocol. In other words, network nodes 10(1) and 10(2) (which do not support the ring protocol) will behave as if they are directly connected (network node 10(1) will behave as if it is connected to network node 10(2) by network link 14(4) and network node 10(2) will behave as if it is connected to network node 10(1) by link 14(2)). This in turn allows network nodes 10(1) and 10(2) to use their standard loop prevention protocol to detect and prevent the data loop formed by the ring.

When implemented within a ring network in which all nodes support the ring protocol (unlike the ring network in FIG. 1), the ring protocol will detect that all of the nodes support the ring protocol and then logically break the data loop formed by ring. In other words, when the ring protocol detects that the ring network includes only nodes that support the ring protocol, the ring protocol causes the ring to behave as if there is a communication break, for purposes of forwarding data packets, within the ring. The ring protocol causes this behavior by blocking data traffic at one point in the ring. In one embodiment, the ring protocol implements this functionality by electing a "designated port" to block data traffic. The ring protocol is implemented by exchanging ring protocol packets, which can contain various ring protocol control messages, among network nodes within the ring. These ring protocol packets are used to detect continuity and connectivity within the ring, to select a designated port, to detect failures within the ring, to cause the designated port to block when the loop is complete, and to cause the designated port to unblock in response to detecting a failure within the ring.

The ring protocol is implemented within each network node 12(1) and 12(2) by a respective ring protocol module 16(1) or 16(2). Ring protocol modules 16(1) and 16(2) are configured to generate and send ring protocol packets as well as to process ring protocol packets received from other nodes. If, for example, exchanged ring protocol packets indicate that a port within network node 12(1) has been elected to be the designated port, ring protocol module 16(1) will operate that port as a designated port. Accordingly, if exchanged ring protocol packets indicate that ring network 5 is complete, ring protocol module 16(1) will cause the designated port to block data traffic. When blocked, the designated port will discard any received data packets (received from either another port within network node 12(1) or from a neighboring node) before those data packets can be further processed or forwarded by network node 12(1).

In one embodiment, the ring protocol is implemented so that the designated port can detect whether the ring network is complete by attempting to send ring protocol packets in either direction on the ring. The ring protocol packets sent by the designated port include a type of ring protocol control message that is sent around the ring, such that if the ring is free from failures, both of the ring protocol control messages will be returned to the designated port within a pre-designated amount of time. Accordingly, if the designated port receives the two ring protocol control messages back within the pre-designated amount of time, the designated port determines that the ring is complete. In this situation, the designated port determines that, since the ring is complete, the designated port should continue to block data traffic to prevent loops.

If instead the designated port does not receive the two ring protocol control messages back within the pre-designated time, the designated port determines that the ring is incomplete (e.g., because a failure has occurred within the ring or because the ring includes nodes that do not support the ring protocol). In response to detecting that the ring is incomplete, the designated port unblocks, allowing data traffic to pass. The designated port can continue to routinely (e.g., periodically or in response to predetermined stimuli) send a pair of ring protocol control messages (one in each direction) in order to detect whether ring has been completed (and thus whether the designated port should begin blocking data traffic again).

Ring protocol packets cannot be properly processed by network nodes 10(1) and 10(2), since those nodes do not implement the ring protocol. Accordingly, if network nodes 10(1) and 10(2) attempt to process ring protocol packets received from network nodes 12(1) and 12(2), unpredictable (and possibly undesirable) behavior may result. Furthermore, if network nodes 10(1) and 10(2) forward ring protocol packets received from network nodes 12(1) and 12(2) to other nodes (not shown), those ring protocol packets may eventually be forwarded to nodes within another network ring that implements the ring protocol. Receipt of such foreign ring protocol packets could cause the other ring network to behave unpredictably.

In order to prevent the ring protocol packets from being processed or forwarded by devices (such as network nodes 10(1) and 10(2)) that do not support the ring protocol, network nodes 12(1) and 12(2) include special information within each ring protocol packet. A device that receives a packet containing that special information will drop the packet unless the device supports the same ring protocol as network nodes 12(1) and 12(2). In other words, in response to detecting that a packet contains the special information, a receiving device that does not support the ring protocol will not perform further processing on the packet and will not forward the packet to any other node. Thus, if received by a device that does not support the ring protocol, the packet will be dropped (i.e., discarded without further processing or forwarding). In contrast, a device that does support the ring protocol will process and forward the packet normally.

The special information included in each ring protocol packet includes, in one embodiment, a special reserved destination address (e.g., a media access control (MAC) address in the 01:80:C2:00:00:0X block of addresses) and protocol type information identifying the ring protocol. The special reserved destination address is one of a set of one or more destination addresses that is reserved by the communication protocol (e.g., Ethernet) used to convey packets between nodes in network 5. Destination addresses within the set are used to identify packets that cannot be forwarded and must be processed locally. If the receiving device does not support the protocol identified by the protocol type field of the packet, the receiving device must drop the packet. Each device that supports the communication protocol is required to implement this behavior. Accordingly, when such a device detects that the destination address of a ring protocol packet is one of the reserved destination addresses, the device will parse the information in the protocol type field of the ring protocol packet. If the device supports the ring protocol identified in the protocol type field, the device will process the ring protocol packet; otherwise, the device will drop the ring protocol packet. Standards established by IEEE 802.1 define a set of such special reserved addresses (e.g., the 01:80:C2:00:00:0X block of MAC addresses). Devices compliant with these standards will behave as described above.

In another embodiment, the special information includes a checksum (e.g., a cyclic redundancy checksum (CRC) that is included in a checksum field of each ring protocol packet). In this embodiment, devices that support the ring protocol implement a particular checksum generating technique (for handling ring protocol packets) that is not used by devices that do not support the ring protocol. As a result, when a device that does not support the ring protocol receives a ring protocol packet and attempts to verify the checksum contained within the ring protocol packet, the receiving device will not be able to generate a matching checksum. Accordingly, the device will drop the packet.

Thus, special information, such as specialized checksums and/or a reserved destination address, can be included in each ring protocol packet in order to cause a device that does not support the ring protocol to drop ring protocol packets. Other information (instead of and/or in addition to specialized checksums and/or reserved destination addresses) can be included in ring protocol packets in order to cause devices that do not support the ring protocol to drop the ring protocol packets.

In the example of FIG. 1, network nodes 12(1) and 12(2) include special information in each ring protocol packet sent on ring network 5. Network nodes 10(1) and 10(2) are configured to drop packets containing that special information. Accordingly, network nodes 10(1) and 10(2) will not process (more than necessary to detect the special information) or forward ring protocol packets.

Since network nodes 10(1) and 10(2) do not support the ring protocol, ring protocol packets will not be forwarded all the way around ring network 5. For example, if network node 12(1) sends a ring protocol packet on link 14(4), the packet will be dropped by network node 10(1) as soon as network node 10(1) detects the special information within the packet. Because of this behavior, network nodes 12(1) and 12(2) that do implement the ring protocol may, in some embodiments, perceive the inability to send ring protocol packets around ring network 5 as evidence of a break within the ring. In response, the ring protocol will prevent the designated port from blocking or cause the designated port to unblock (the designated port would block if ring network 5 was functioning properly and all nodes within ring network 5 supported the ring protocol).

In embodiments in which the ring protocol does not break the data loop that is present within ring network 5, a loop prevention protocol, such as a spanning tree protocol (STP), is needed to break the data loop. A loop prevention protocol is a network protocol that is configured to prevent data loops within a network. In contrast to a ring protocol, a loop prevention protocol is not designed for use specifically within a ring network.

In one such embodiment, network nodes 12(1) and 12(2) (which support the ring protocol) are configured to forward loop prevention protocol packets around the loop without modifying or processing (except as needed for forwarding purposes) the loop prevention protocol packets. Thus, a chain of one or more nodes that support the ring protocol will effectively behave like a network link when transferring loop prevention protocol packets between nodes that do not support the ring protocol. For example, if spanning tree protocol is used as the loop prevention protocol and network node 12(1) receives a spanning tree protocol packet from network node 10(1), network node 12(1) will forward the spanning tree protocol packet by generating a copy of the spanning tree protocol packet and then sending the copy to network node 12(2). Network node 12(2) will similarly forward the spanning tree protocol packet by generating a copy and sending the copy to network node 10(2).

Since nodes (such as network nodes 12(1) and 12(2)) that support the ring protocol will behave like a network link when handling loop prevention protocol packets, any loop prevention protocol packets sent on ring network 5 will pass through the nodes that support the ring protocol within the ring network. This behavior allows the loop prevention protocol to detect that a data loop is possible. Accordingly, the loop prevention protocol will act to prevent the data loop. For example, if spanning tree protocol is being used as the loop prevention protocol and is implemented by network nodes 10(1) and 10(2), these network nodes will routinely (e.g., periodically, in response to predetermined stimuli, or the like) generate spanning tree bridge protocol data units (BPDUs). Network nodes 10(1) and 10(2) will exchange these BPDUs via links 14(1), 14(2), and 14(4). Based on the exchange of BPDUs via these links, network nodes 10(1) and 10(2) will determine that a data path exists on this portion of ring network 5. Similarly, network nodes 10(1) and 10(2) will exchange BPDUs via link 14(3) and determine that a data path exists on this portion of ring network 5. In response to detecting both data paths, the spanning tree protocol will detect a possible data loop on ring network 5 and prevent the data loop by blocking an appropriate port either node 10(1) or node 10(2).

In one embodiment, the ring protocol operates to block the transmission of data packets until the ring protocol has had the opportunity to exchange ring protocol packets among nodes in order to detect whether a data loop is present. Additionally, if a data loop is not detected, the ring protocol operates to block data traffic for a short time period (the length of this time period can be configured by an administrator). During the time in which data traffic is blocked, the ring protocol will allow loop prevention protocol packets to be forwarded around the ring via the nodes (such as network nodes 12(1) and 12(2)) that support the ring protocol. Because of this behavior, any devices that implement the loop prevention protocol can detect the presence of a data loop before the ring protocol allows data traffic to be sent. In other words, the loop prevention protocol will have an opportunity to detect the presence of the data loop before a data loop is actually present (since network nodes 12(1) and 12(2) will not be forwarding data traffic initially).

In some embodiments, network nodes 12(1) and 12(2) can detect that their neighboring nodes 10(1) and 10(2) respectively do not support the ring protocol based on the inability of network nodes 10(1) and 10(2) to send ring protocol packets or to respond to ring protocol packets. For example, the ring protocol can include a "hello" message. Normally, when two nodes that both support the ring protocol are connected by a network link, one (or both) of the nodes will send a hello message. The hello message is included in a ring protocol packet. In response to receiving a hello message, a node that supports the ring protocol will generate a responsive hello message and send that hello message to the node that sent the original hello message. If a hello message is not returned within a prespecified amount of time (or if several such hello messages are not returned), a node determines that the other node does not support the ring protocol. Accordingly, since a node that does not support the ring protocol will drop ring protocol packets as described above, such a node cannot respond to a ring protocol hello message within the prespecified amount of time.

In one embodiment, instead of acting to unblock the designated port (as described above) in response to detecting nodes that do not support the ring protocol within the ring network, the ring protocol instead implements one or more "reflector" ports. In this embodiment, in response to detecting that a neighboring node does not support the ring protocol, network nodes 12(1) and 12(2) can reconfigure the port coupled to that neighboring port as a reflector port. A reflector port is configured to resend all ring protocol messages received by the reflected port from the reflector port. For example, if the port within network node 12(1) that is coupled to link 14(4) detects that network node 10(1) does not support the ring protocol, ring protocol module 16(1) can respond by configuring the port that is coupled to link 14(1) as a reflector port. Similarly, the port within network node 12(2) that is coupled to link 14(2) can detect that network node 10(2) does not support the ring protocol, causing ring protocol module 16(2) to configure the port within network node 12(2) that is coupled to link 14(1) as a reflector port.

Whenever a reflector port receives a ring protocol packet containing a type of ring protocol control message that is sent around a ring to detect connectivity (i.e., to detect whether the ring is broken or unbroken), the reflector port will notify the ring protocol module. The ring protocol module generates a copy of that ring protocol packet and resends the ring protocol packet from the reflector port. As a result of this behavior, ring protocol packets that are sent around the ring to detect connectivity (e.g., whether the ring is complete) will be reflected back into the ring. Assuming no other breaks or failures within the ring network, ring protocol packets that are sent by a device (e.g., such as the network node that includes the designated port) to determine whether the ring is complete will be returned to that device. This causes the device to determine that the ring is complete and to act accordingly (e.g., by blocking the designated port) to prevent a data loop.

Thus, in embodiments that implement reflector ports, the ring protocol can detect that a data loop is present and block the designated port. In such embodiments, the designated port, when blocking, will block data traffic, including loop prevention protocol packets. This prevents the loop prevention protocol from detecting a data loop in the ring. Accordingly, in embodiments that implement reflector ports, the designated port (as opposed to a loop prevention protocol implemented by nodes that do not support the ring protocol) will act to break the data loop within the ring.

Figure 2:
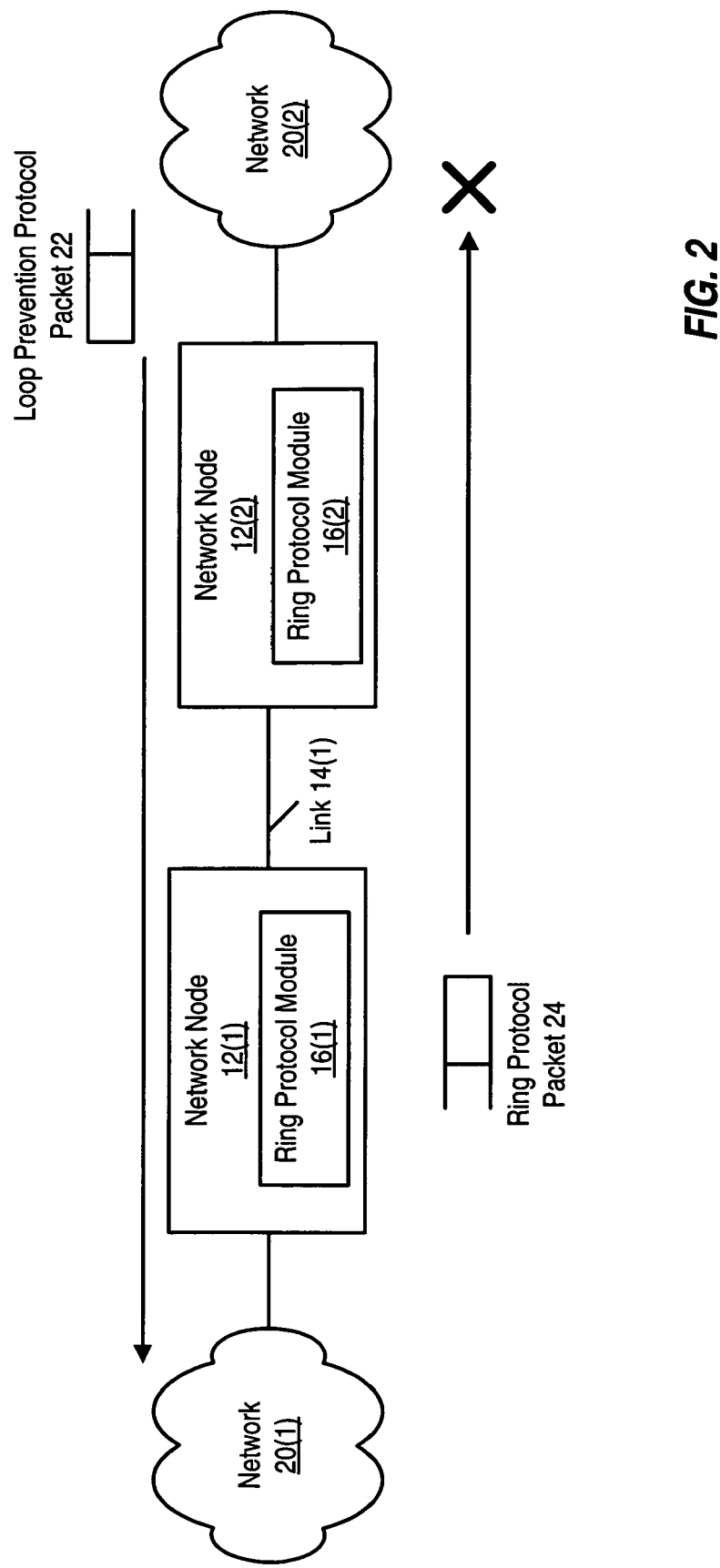
FIG. 2 is a block diagram of illustrating how network nodes that support a ring protocol can be coupled to network devices that do not support the ring protocol, according to one embodiment of the present invention.

FIG. 2 is a block diagram of illustrating how network nodes that support a ring protocol can be coupled to network nodes that do not support the ring protocol. As shown, network nodes 12(1) and 12(2) are coupled by link 14(1). Network node 12(1) is coupled to network 20(1), while network node 12(2) is coupled to network 20(2). Networks 20(1) and 20(2) include at least some devices that do not support the ring protocol. Network 20(1) may be coupled to network 20(2) by devices other than network nodes 12(1) and 12(2) in some embodiments.

As shown in FIG. 2, a loop prevention protocol packet 22 that is generated within network 20(2) will be forwarded by network nodes 12(2) and 12(1) to network 20(1) when reflector ports are not enabled. In particular, network nodes 12(1) and 12(2) will simply act as repeaters when handling loop prevention protocol packet 22.

A ring protocol packet 24 generated by network node 12(1) and sent on link 14(1) will be received by network node 12(2). As described above, ring protocol packet 24 includes special information that causes devices that do not support the ring protocol to drop ring protocol packet 24. Ring protocol module 16(2) within network node 12(2) processes ring protocol packet 24, generates a copy (if appropriate), and (if reflector ports are not enabled) forwards the copy to network 20(2). Since network 20(2) does not support the ring protocol, a receiving device within network 20(2) will drop ring protocol packet 24, as indicated by the "X" in FIG. 2.

Figure 3:
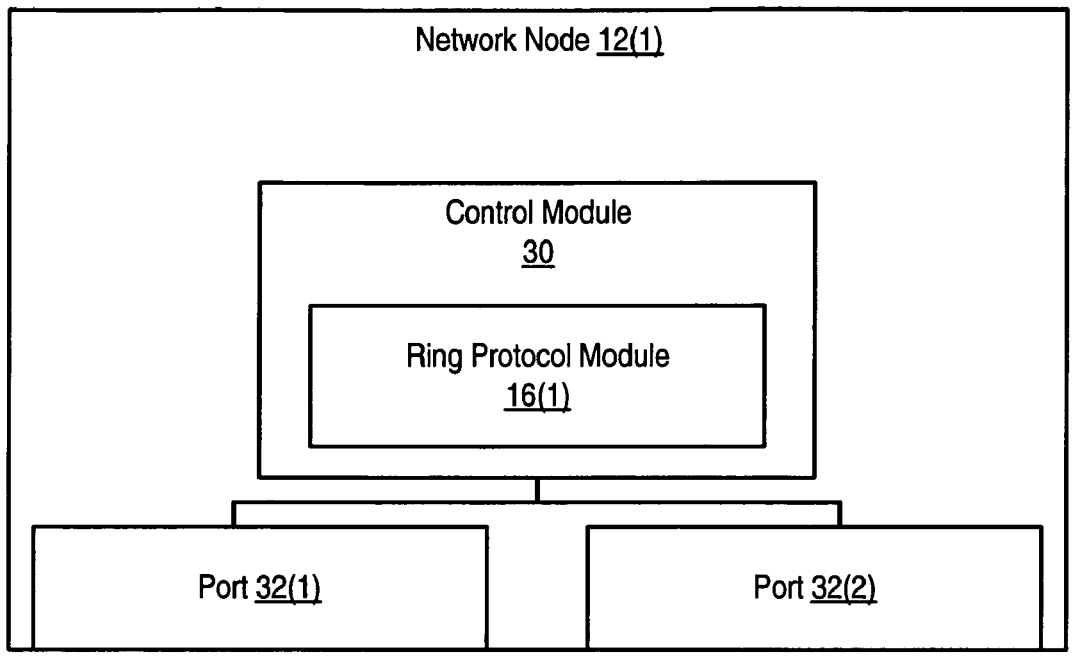
FIG. 3 shows a block diagram of a network node that supports a ring protocol, according to one embodiment of the present invention.

FIG. 3 shows a block diagram of a network node 12(1) (e.g., as shown in FIGS. 1 and 2) that supports a ring protocol. As shown, network node 12(1) includes a control module 30 (e.g., a forwarding engine and/or route processor) that includes ring protocol module 16(1). Control module 30 is coupled to two ring ports 32(1) and 32(2).

Ring protocol module 16(1) is configured to implement a ring protocol that detects connectivity within a ring network and selectively blocks a port within the ring network if needed to prevent a data loop within the ring network. Ring protocol module 16(1) is configured to exchange ring protocol packets with other network nodes. When generating a ring protocol packet, ring protocol module 16(1) includes the special information that causes the ring protocol packet to be dropped by devices that do not support the ring protocol.

Ring protocol module 16(1) is configured to cause network node 12(1) to block data traffic (except for loop prevention protocol messages) when network node 12(1) is initially powered on (i.e., initially, any data packets, other than loop prevention protocol packets, received via ring ports 32(1) and 32(2) will be dropped). During this time, ring protocol packets are exchanged with other network nodes that support the ring protocol. These ring protocol packets are used to perform functions such as electing a designated port, determining connectivity within the ring, and so on. If a data loop is present (as determined by the exchange of ring protocol packets) and if a port within network node 12(1) was elected designated port, ring protocol module 16(1) will block the designated port. Once connectivity within the ring has been determined and loop prevention protocol packets have been forwarded for a prespecified amount of time, ring protocol module 16(1) allows data traffic to be forwarded normally.

In some embodiments, ring protocol module 16(1) is configured to detect whether a port (such as port 32) within network node 12(1) is coupled to a device that does not support the ring protocol. In such a situation, ring protocol module 16(1) can be configured to configure another port within network node 12(1) as a reflector port, as described above.

Figure 4:
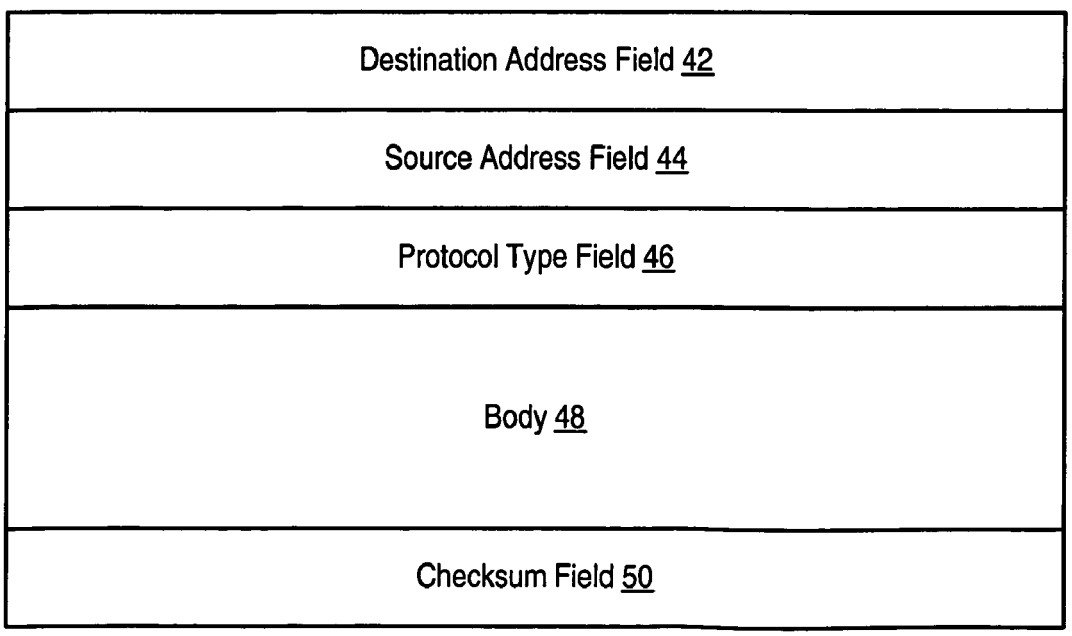
FIG. 4 is a block diagram of a ring protocol packet, according to one embodiment of the present invention.

FIG. 4 is a block diagram of a ring protocol packet 40 that includes special information that will cause devices that do not support the ring protocol to drop ring protocol packet 40. As shown, ring protocol packet 40 includes a destination address field 42, a source address field 44, a protocol type field 46, a body 48, and a checksum field 50 (e.g., containing an Ethernet checksum).

In one embodiment, the special information includes the value of destination address field 42 and the value of the protocol type field 46. In this embodiment, the value of destination address field 42 is a reserved destination address and protocol type field 46 identifies the ring protocol. Packets sent to the reserved destination address must be dropped unless the receiving device supports the ring protocol identified in protocol type field 46. The reserved destination address may be selected from a set of destination addresses that has been reserved by a standards organization such as IEEE 802.1.

In another embodiment, the special information includes the value of checksum field 50. In this embodiment, devices that support the ring protocol use a special checksum generating technique (not used by devices that do not support the ring protocol) when generating checksums for inclusion in ring protocol packets (the devices that support the ring protocol can use a common checksum generation technique for other types of packets). Because the value of checksum field 50 is generated using a technique that is not available to devices that do not support the ring protocol, those other devices will not be able to generate a matching checksum for ring protocol packets. As a result, devices that do not support the ring protocol cannot verify the checksum included in ring protocol packets and will be forced to drop ring protocol packets.

Figure 5:
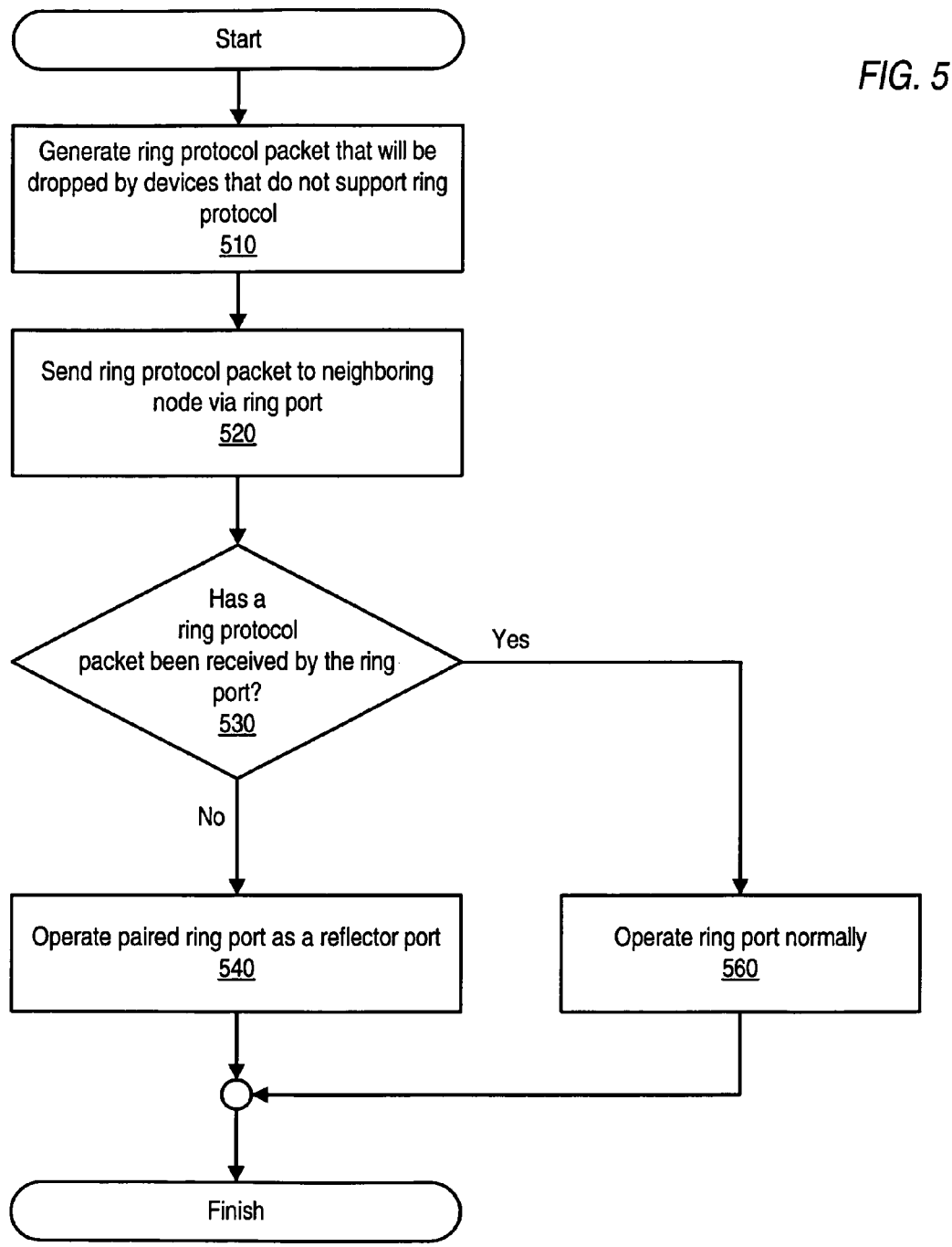
FIG. 5 is a flowchart of a method of operating a network node that supports a ring protocol in an environment where some nodes may not support the ring protocol, according to one embodiment of the present invention.

FIG. 5 is a flowchart of a method of operating a network node that supports a ring protocol in an environment where some nodes may not support the ring protocol. This method can be performed by a device such as network node 12(1) of FIGS. 1, 2, and 3 or network node 12(2) of FIGS. 1 and 2.

As shown, the method begins at 510, when the network node generates a ring protocol packet. The ring protocol packet will be dropped by devices that do not support the ring protocol. For example, the ring protocol packet can include special information (e.g., such as a reserved destination address and protocol type or such as a specialized checksum) that causes receiving devices that do not support the ring protocol to drop the ring protocol packet.

The network device then sends the ring protocol packet to a neighboring device via a ring port, as shown at 520. If the neighboring device supports the ring protocol, the neighboring device will process and/or forward the ring protocol packet as appropriate. Otherwise, the neighboring device will drop the ring protocol packet.

If the network device does not receive any ring protocol packets from the neighboring device via the ring port within a timeout period, as detected at 530, the network device determines that the neighboring device does not support the ring protocol. In response, the network device will operate the paired ring port (the ring port that is paired with the ring port coupled to the neighboring device) as a reflector port, as shown at 540. Once the paired ring port is configured as a reflector port, certain ring protocol messages received via the reflector port will be resent from the reflector port.

In some embodiments if the neighboring device does not support the ring protocol, the network device ceases sending ring protocol packets (or at least certain types of ring protocol packets) to the neighboring device. The network device can continue to send ring protocol packets in order to quickly detect configuration changes in the neighboring device (e.g., such as the neighboring device enabling the ring protocol). If the neighboring device does support the ring protocol, the network device will operate the ring port (and its paired ring port) normally, as shown at 560.

While the network device is generating and sending ring protocol packets, the network device may also receive one or more loop prevention protocol packets (e.g., spanning tree protocol BPDUs) via the ring port. The network device will forward such loop prevention protocol packets to the paired ring port. The network device will not process (more than necessary to forward the loop prevention protocol packets) or modify the loop prevention protocol packets. If, however, the network device includes a designated port and the designated port is blocked, the designated port will not forward loop prevention protocol packets.

At least some of the operations shown in FIG. 5 can be repeated one or more times. For example, during normal operation when the neighboring node does support the ring protocol, the network device can periodically repeat operations 510 and 520.

In the example of FIG. 5, the paired ring port is configured as a reflector port (operation 540) if the neighboring device does not support the ring protocol. It is noted that, in alternative embodiments, operation 540 is not performed. Instead, the network device operates the paired ring port normally.

Throughout this disclosure, the term "packet" is used to refer to a logical grouping of information sent as a data unit over a transmission medium. Packets may include header and/or trailer information that surrounds user data contained in the data unit. For purposes of this disclosure, a "packet" may include a cell, datagram, frame, message, segment, or any other logical group of information.

Figure 6:
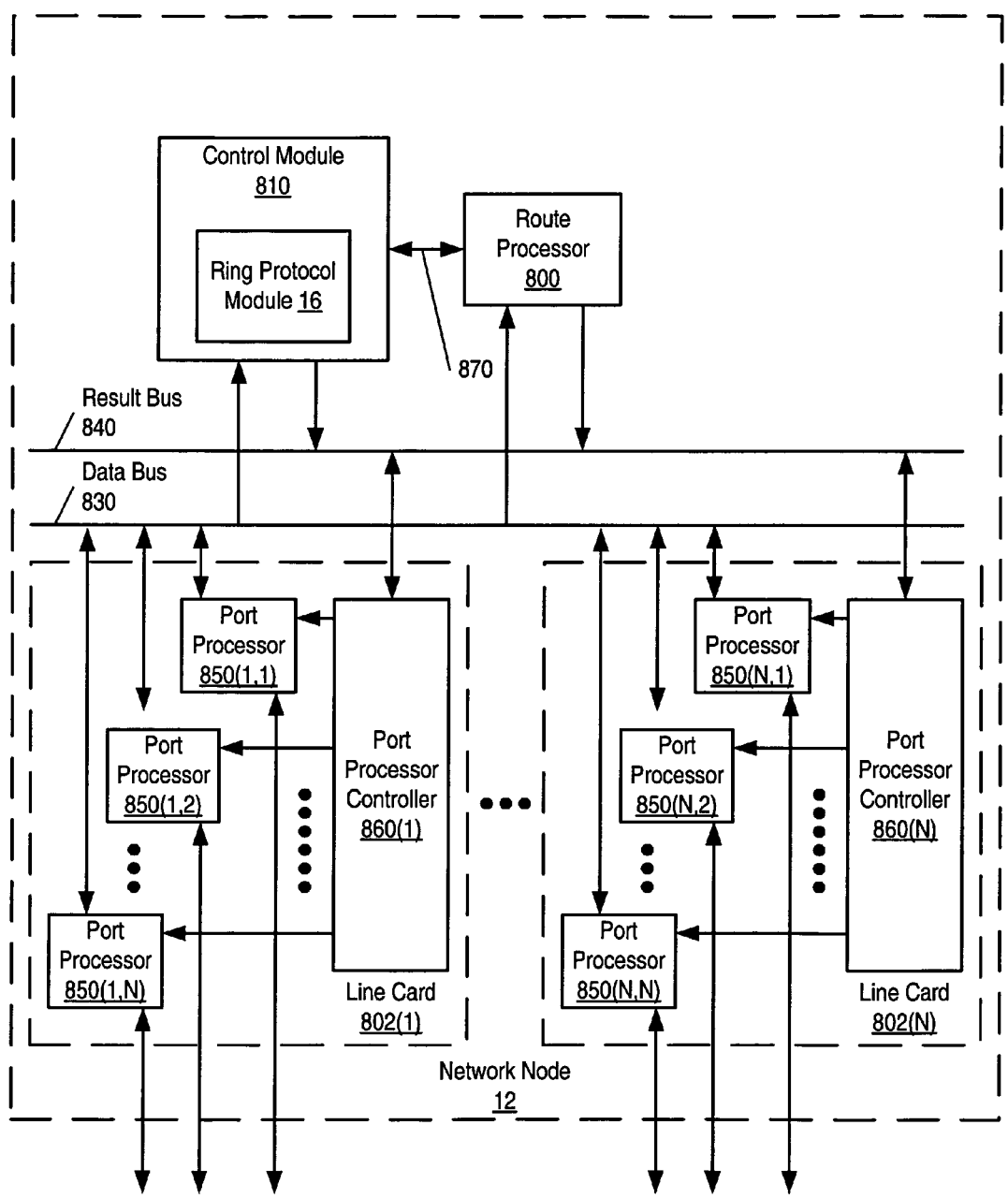
FIG. 6 shows a block diagram of a network device that supports a ring protocol, according to one embodiment of the present invention.

FIG. 6 shows a block diagram of a network device that supports a ring protocol. It is noted that this diagram is presented by way of example only; other embodiments may be implemented in a significantly different manner.

FIG. 6 is a block diagram of a network node 12 (e.g., one of network nodes 12(1)-12(2) of FIGS. 1, and 2). In this depiction, network node 12 includes a number of line cards (line cards 802(1)-802(N)) that are communicatively coupled to a control module 810 (e.g., similar to control module 30 of FIG. 3) and a route processor 800 via a data bus 830 and a result bus 840. Control module 810 includes forwarding engine functionality as well as functionality to implement ring protocol module 16 (e.g., one of ring protocol modules 16(1) or 16(2) of FIGS. 1 and 2). In alternative embodiments, all or part of ring protocol module 16 can be implemented by route processor 800.

Line cards 802(1)-802(N) include a number of port processors 850(1,1)-850(N,N) which are controlled by port processor controllers 860(1)-860(N). It will also be noted that control module 810 and route processor 800 are not only coupled to one another via data bus 830 and result bus 840, but are also communicatively coupled to one another by a communications link 870. It is noted that in alternative embodiments, each line card can include a forwarding engine (as opposed to having a centralized forwarding engine within control module 810). In such alternative embodiments, all or part of ring protocol module 16 can also be included on each line card. Additionally, all or part of the functionality of ring protocol module 16 can be implemented within a port processor controller (e.g., one of port processor controllers 860(1)-860(N)). For example, the functionality needed to operate a particular port processor as a ring port, a designated port, or a reflector port can be included in the appropriate port processor controller.

When a packet is received, the packet is identified and analyzed by a network device such as network node 12 in the following manner. Upon receipt, a packet (or some or all of its control information) is sent from the one of port processors 850(1,1)-850(N,N) at which the packet was received to one or more of those devices coupled to data bus 830 (e.g., others of port processors 850(1,1)-850(N,N), control module 810 and/or route processor 800). Handling of the packet can be determined, for example, by control module 810. For example, control module 810 may determine that the packet should be forwarded to one or more of port processors 850(1,1)-850(N, N). This can be accomplished by indicating to corresponding one(s) of port processor controllers 860(1)-860(N) that the copy of the packet held in the given one(s) of port processors 850(1,1)-850(N,N) should be forwarded to the appropriate one of port processors 850(1,1)-850(N,N). Control module 810 can also detect whether the packet is a ring protocol packet and pass the packet (or some or all of its control information) to ring protocol module 16 as needed.

In the example of FIG. 6, one or more (e.g., a pair) of port processors 850(1,1)-850(N,N) can be configured as ring ports for the same ring network. One or more of these ring ports can then be configured as a special ring port (e.g., a reflector port or a designated port), as determined based upon the exchange of ring protocol packets with other network nodes.

Figure 7:
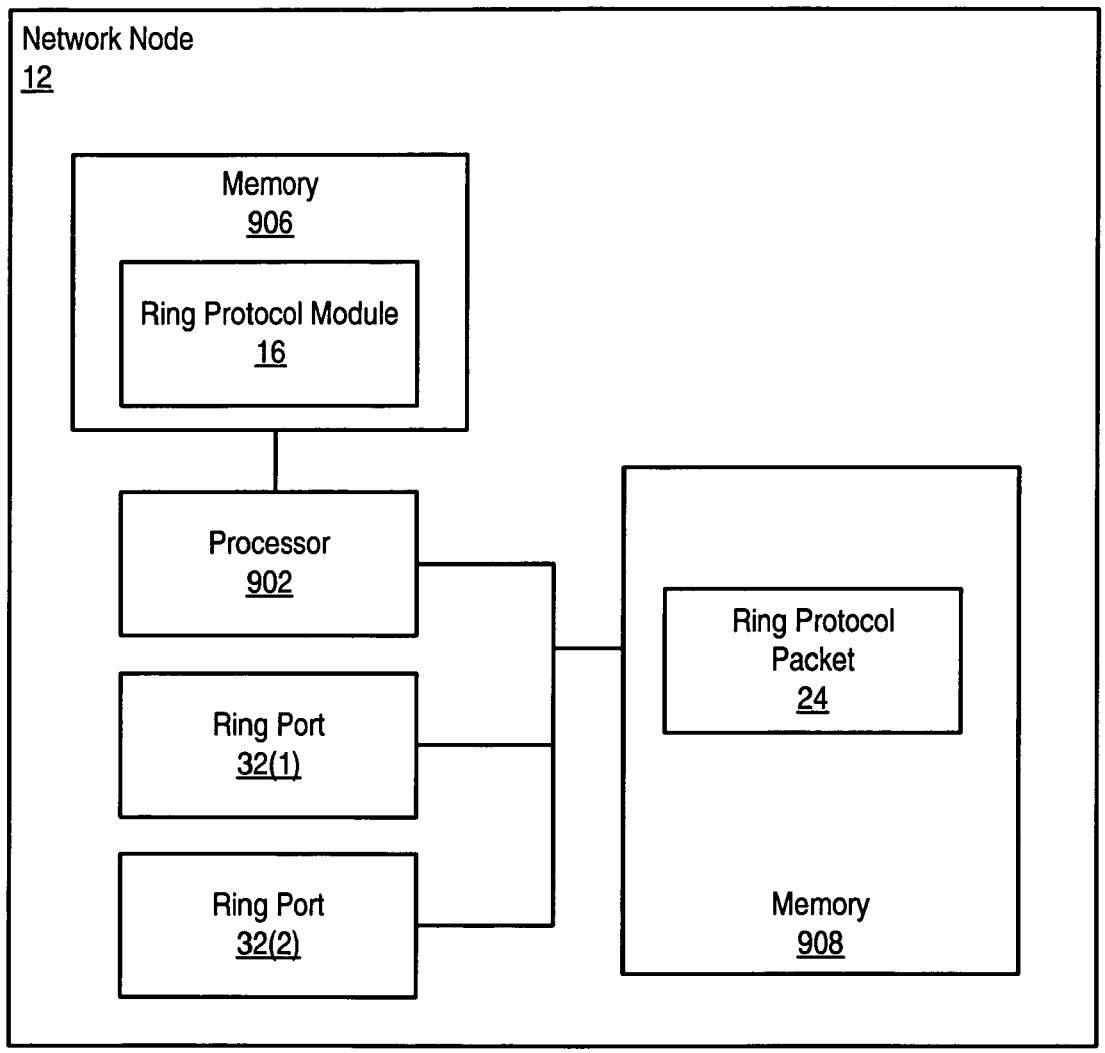
FIG. 7 is a block diagram of a network device that implements a ring protocol module in software, according to one embodiment of the present invention.

FIG. 7 is a block diagram of a network node 12 (e.g., as shown in FIG. 6), which illustrates how ring protocol module 16 can be implemented in software. As illustrated, network node 12 includes one or more processors 902 (e.g., microprocessors, PLDs (Programmable Logic Devices), or ASICs (Application Specific Integrated Circuits)) configured to execute program instructions stored in memory 906. These program instructions include instructions executable to implement ring protocol module 16. Memory 906 can include various types of RAM (Random Access Memory), ROM (Read Only Memory), Flash memory, MEMS (Micro Electro-Mechanical Systems) memory, and the like. Processor 902 and memory 906 can be included in a port processor (e.g., port processors 850(1,1)-850(N,N) of FIG. 8), a port processor controller (e.g., port processor controllers 860(1)-860(N) of FIG. 8), a control module or forwarding engine (e.g., control module 810 of FIG. 6), or a route processor (e.g., route processor 800 of FIG. 8). Processor 902 and memory 906 are coupled to send and receive data and control signals by a bus or other interconnect.

Network node 12 also includes two ports 32(1) and 32(2). These ports can be operated as ring ports in a ring network. Each port 32(1) and 32(2) can be configured (e.g., through the use of state information associated with the ring port) as a reflector port or designated port by ring protocol module 16 if needed (as determined by the exchange of ring protocol packets, or lack thereof, with other nodes in the network). In response to receiving a ring protocol packet 24, a port 32(1) or 32(2) can store a copy of the ring protocol packet 24 in memory 908. The receiving port can also notify ring protocol module 16 that a ring protocol packet has been received (e.g., by generating an interrupt to processor 902). Ring protocol module 16 can then access the ring protocol packet and, if needed, cause the port that received the message to resend the received ring protocol packet on the ring network (if the ring port is a reflector port) or cause the ring protocol packet to be forwarded or dropped as appropriate. Processor 902, ports 32(1) and 32(2), and memory 908 are coupled to send and receive data and control signals by a bus or other interconnection.

In this example, program instructions executable to implement ring protocol module 16 are stored in memory 906. The program instructions and data implementing ring protocol module 16 can be stored on various computer readable media such as memory 906. In some embodiments, ring protocol module software is stored on a computer readable medium such as a CD (Compact Disc), DVD (Digital Versatile Disc), hard disk, optical disk, tape device, floppy disk, and the like). In order to be executed by processor 902, the instructions and data implementing ring protocol module 16 are loaded into memory 906 from the other computer readable medium. The instructions and/or data implementing ring protocol module 16 can also be transferred to network node 12 for storage in memory 906 via a network such as the Internet or upon a carrier medium. In some embodiments, a computer readable medium is a carrier medium such as a network and/or a wireless link upon which signals such as electrical, electromagnetic, or digital signals, on which the data and instructions implementing ring protocol module 16 are encoded, are conveyed.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
generating information, wherein
the information causes a network node that does not support a ring protocol to drop a ring protocol packet comprising the infoiiiiation, upon receiving the ring protocol packet,
the information allows a network node that supports the ring protocol to process a ring protocol packet comprising the information, upon receiving the ring protocol packet, and
the information comprises a checksum, and the checksum is calculated using a different algorithm than an algorithm used by network devices that do not implement the ring protocol;
generating the ring protocol packet, wherein
the generating is performed by a first network node, and
the first network node supports the ring protocol,
including the information in the ring protocol packet; and
sending the ring protocol packet from the first network node to a second network node,
wherein
the second network node is coupled to the first network node by a ring network,
and
the second network node does not support the ring protocol.

2. The method of claim 1, further comprising:
detecting whether a neighboring node implements the ring protocol, wherein
the detecting comprises detecting whether the neighboring node sends any ring protocol packets.

3. The method of claim 2, further comprising:
selecting to open a designated port, in response to detecting that the neighboring node does not implement the ring protocol.

4. The method of claim 1, further comprising:
receiving a loop prevention protocol packet from a neighboring node via a first ring port; and
outputting the loop prevention protocol packet from a second ring port paired with the first ring port.

5. The method of claim 4, wherein
the loop prevention protocol packet is a spanning tree protocol packet.

6. The method of claim 1, further comprising:
receiving the ring protocol packet at the second network node; and
dropping the ring protocol packet, in response to detecting the information in the ring protocol packet.

7. A network node, comprising:
a ring port; and
a ring protocol module coupled to the ring port, wherein
the network node supports a ring protocol,
the ring protocol module is configured to generate information that causes a network node that does not support the ring protocol to drop a ring protocol packet comprising the information, upon receiving the ring protocol packet, and allows a network node that supports the ring protocol to process a ring protocol packet comprising the information, upon receiving the ring protocol packet, wherein the information comprises a checksum, and the checksum is calculated using a different algorithm than an algorithm used by network devices that do not implement the ring protocol, the ring protocol module is configured to generate the ring protocol packet to be sent via the ring port, the ring protocol module is configured to include the information in the ring protocol packet, and the ring protocol module is configured to send the ring protocol packet from the network node to a neighboring network node, wherein the neighboring network node is coupled to the network node by a ring network, and the neighboring network node does not support the ring protocol.

8. The network node of claim 7, wherein the ring protocol module is configured to:

detect that the neighboring network node does not implement the ring protocol if the neighboring network node fails to send any ring protocol packets within a prespecified amount of time.

9. The network node of claim 8, wherein the network node is configured to:

receive a loop prevention protocol packet from the neighboring network node via the ring port; and output the loop prevention protocol packet from a second ring port paired with the ring port.

10. The network node of claim 9, wherein
the loop prevention protocol packet is a spanning tree protocol packet.

11. A system comprising:

means for generating information, wherein the information causes a network node that does not support a ring protocol to drop a ring protocol packet comprising the information, upon receiving the ring protocol packet, the information allows a network node that supports the ring protocol to process a ring protocol packet comprising the information, upon receiving the ring protocol packet, and the information comprises a checksum, and the checksum is calculated using a different algorithm than an algorithm used by network devices that do not implement the ring protocol;

means for generating the ring protocol packet;

means for including the information in the ring protocol packet; and means for sending the ring protocol packet from a network node to a neighboring network node, wherein the neighboring network node does not support the ring protocol, the network node supports the ring protocol, and the neighboring network node is coupled to the network node by a ring network.

\* \* \* \* \*